United States Patent
Digrigoli et al.

(10) Patent No.: US 10,810,582 B2
(45) Date of Patent: Oct. 20, 2020

(54) MULTI CURRENCY EXCHANGES BETWEEN PARTICIPANTS

(71) Applicant: PAYPAL, INC., San Jose, CA (US)

(72) Inventors: Giacomo Digrigoli, San Francisco, CA (US); George Lee, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 115 days.

(21) Appl. No.: 16/012,650

(22) Filed: Jun. 19, 2018

(65) Prior Publication Data

US 2018/0365685 A1 Dec. 20, 2018

Related U.S. Application Data

(63) Continuation of application No. 14/263,874, filed on Apr. 28, 2014, now Pat. No. 10,002,354, which is a continuation of application No. 13/567,902, filed on Aug. 6, 2012, now Pat. No. 8,712,913, which is a continuation of application No. 13/212,994, filed on Aug. 18, 2011, now Pat. No. 8,249,990, which is a continuation of application No. 12/818,935, filed on Jun. 18, 2010, now Pat. No. 8,055,582, which is a continuation of application No. 10/608,525, filed on Jun. 26, 2003, now Pat. No. 7,742,985.

(51) Int. Cl.
G06Q 20/38 (2012.01)
G06Q 20/10 (2012.01)
G06Q 20/40 (2012.01)
G06Q 30/06 (2012.01)
G06Q 40/00 (2012.01)

(52) U.S. Cl.
CPC ............ *G06Q 20/381* (2013.01); *G06Q 20/10* (2013.01); *G06Q 20/102* (2013.01); *G06Q 20/40* (2013.01); *G06Q 30/06* (2013.01); *G06Q 40/12* (2013.12)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| | | | |
|---|---|---|---|
| 6,205,433 B1 * | 3/2001 | Boesch ................ | G06Q 20/02 705/27.1 |
| 8,249,990 B2 * | 8/2012 | Digrigoli ............... | G06Q 20/10 705/44 |
| 8,341,054 B2 * | 12/2012 | Klein ..................... | G06Q 40/06 705/35 |

(Continued)

OTHER PUBLICATIONS

Schmerken, Ivy, Currency converter positions for E-Cash, Wall Street & Technology, New York: vol. 1, Iss. 9; p. 62, 1 pgs., Sep. 1996.*

*Primary Examiner* — Frantzy Poinvil
(74) *Attorney, Agent, or Firm* — Haynes and Boone, LLP

(57) ABSTRACT

A method and apparatus for facilitating payment transactions in multiple currencies between participants is provided. In one embodiment, an option is provided to a user to select a currency in which to make a payment. An indication of the selected currency in which to make the payment is received. A determination is made as to whether the selected currency is a primary currency of an account of the user. Based on the selected currency being different from the primary currency of the account of the user, the payment is converted to the selected currency.

20 Claims, 15 Drawing Sheets

(56) References Cited

U.S. PATENT DOCUMENTS

| | | | | |
|---|---|---|---|---|
| 8,712,913 | B2* | 4/2014 | Digrigoli | G06Q 20/10 |
| | | | | 705/44 |
| 8,818,968 | B2* | 8/2014 | Gandhi | G06Q 30/00 |
| | | | | 707/694 |
| 9,396,793 | B2* | 7/2016 | Wu | G11C 13/0004 |
| 9,639,852 | B2* | 5/2017 | Low | G06Q 20/10 |
| 2010/0217710 | A1* | 8/2010 | Fujita | G06Q 20/06 |
| | | | | 705/71 |
| 2013/0018738 | A1* | 1/2013 | Faires | G06Q 20/322 |
| | | | | 705/16 |
| 2014/0019351 | A1* | 1/2014 | Carmichael | G06K 7/10079 |
| | | | | 705/41 |
| 2014/0236815 | A1* | 8/2014 | Digrigoli | G06Q 20/10 |
| | | | | 705/39 |
| 2015/0019421 | A1* | 1/2015 | Low | G06Q 20/10 |
| | | | | 705/41 |
| 2015/0154572 | A1* | 6/2015 | von NotHaus | G06Q 20/20 |
| | | | | 705/21 |
| 2016/0071205 | A1* | 3/2016 | Hill | G06Q 20/04 |
| | | | | 705/35 |
| 2018/0253727 | A1* | 9/2018 | Ortiz | G06Q 20/405 |

* cited by examiner

```
                    ┌─────────────┬────────────┬───────────────┬────┐
                    │ MY ACCOUNT  │ SEND MONEY │ REQUEST MONEY │ ME │
                    ├─────────────┴────────────┴───────────────┴────┤
                    │ SEND MONEY                                    │
                    │ PAY ANYONE WITH AN EMAIL ADDRESS - EVEN IF THEY DON'T HAVE
                    │ RECIPIENT'S EMAIL: [JEEVES@BRIFISHTEAS.CO.UK]  TRY
                    │                    [- OR - SELECT A RECIPIENT ▼]
                    │            AMOUNT: [25]
       1102─────●   CURRENCY: [U.S. DOLLARS        ▼] [?]
                    │              TYPE: [U.S. DOLLARS       ▼] [?]
                    │                    CANADIAN DOLLARS
                    │          SUBJECT:  EUROS
                    │         (OPTIONAL) PRODUCT SEARCH (?)
                    │              NOTE: YEN
                    │         (OPTIONAL)
```

*Fig. 11*

```
┌──────────────────────────────────────────────────────────────────┐
│ CHECK PAYMENT DETAILS                          SECURE TRANSACTION 🔒
│ PAYMENT DETAILS
│        PAY TO: JEEVES@BRIFISHTEAS.CO.UK
│   USER STATUS: VERIFIED BUSINESS MEMBER (4)
│          TYPE: SERVICE
│        AMOUNT: €25.00
 1202 ●  TOTAL AMOUNT: €25.00 (EQUAL TO $39.16)
│ ─────────────────────────────────────────────
│ SOURCE OF FUNDS
│    U.S. DOLLAR BALANCE: $39.16
│ MORE FUNDING OPTIONS
│
│        1204 ────● EXCHANGE RATE AS OF SEP.29, 2002:
│                   1 U.S. DOLLAR = 0.638405 POUNDS STERLING
│ ─────────────────────────────────────────────
│ SHIPPING INFORMATION
│ ● SHIP TO [1006 ALMANOR AVE, ANDNIO PARK, CA 94025, USA (CONFIRMED) ▼]  ADD ADDRESS
│ ○ NO SHIPPING ADDRESS REQUIRED
│             [SEND MONEY] [EDIT] [CANCEL]
└──────────────────────────────────────────────────────────────────┘
```

*Fig. 12*

```
RECENT ACTIVITY | ALL ACTIVITY | MY AUCTIONS    HELP
[FILE] [TYPE] [TO/FROM] [NAME/EMAIL] [AMOUNT] [DATE] [STATUS] [ACTION]
☐  |PAYMENT|FROM    |MEDOWARE  |EUR 50.00 |SEP 29, 2002 |PROCLAIMED |(ACCEPT)(DENY)|
[FILE SELECTED ITEMS]  [FILE ALL]
```

[MY ACCOUNT] [SEND MONEY] [REQUEST MONEY] [MERCHANT TOOLS] [AUCTION TOOLS]

ACCEPT OR DENY A PAYMENT    — 1304

YOU HAVE RECEIVED A PAYMENT OF €50.00 EUROS FROM MEDOWARE, <u>VERIFIED BUSINESS MEMBER (6)</u>. WHAT WOULD YOU LIKE TO DO WITH THIS PAYMENT?

○ ACCEPT THIS PAYMENT, CONVERT IT TO $47.33 U.S. DOLLARS, AND TRANSFER IT TO MY U.S. DOLLAR BALANCE.  ⟵ 1304

○ ACCEPT THIS PAYMENT IN EUROS AND CREATE A EURO BALANCE IN MY PAYPAL ACCOUNT

○ DENY THIS PAYMENT

[SUBMIT] [CANCEL]

PREMIER ACCOUNT OVERVIEW
NAME: SERAPHNE KOLOSKY
EMAIL: <u>USA@BC.COM</u>    (<u>ADD EMAIL</u>)
STATUS: <u>UNVERIFIED (0)</u>

<u>BALANCE</u> | <u>MANAGE</u> | <u>TRANSFER</u>       <u>VIEW LIMITS</u>

1402 ⎯
```
         U.S. DOLLAR (PRIMARY):  $217.69
                       EUR      +7.95
         CURRENT TOTAL IN U.S. DOLLARS:  $263.08
```

<u>FORM A RETURN ON REST U.S. DOLLAR BALANCE!</u>

RECENT ACTIVITY | <u>ALL ACTIVITY</u> | <u>MY AUCTIONS</u>    NEW!
[FILE] [TYPE] [TO/FROM] [NAME/EMAIL] [AMOUNT] [DATE] [STATUS] [ACTION]
☐  |PAYMENT|FROM    |MEDOWARE  |EUR 50.00 |SEP 29, 2002 |COMPLETED |          |
[FILE SELECTED ITEMS]  [FILE ALL]

ALL ACTIVITY FROM AUG 30, 2002 TO SEP 29, 2002 – DISPLAED MY HISTORY

| | TYPE | TO/FROM | NAME/EMAIL | STATUS | GROSS | FEE | NET AMOUNT |
|---|---|---|---|---|---|---|---|
| 3. | CURRENCY CONVERSION (CREDIT) | TO U.S. CALLER | FROM LURE | COMPLETED | $45.39 | $0.00 | $45.39 |
| 2. | CURRENCY CONVERSION (DEBIT) | FROM EURO | TO U.S. DOLLAR | COMPLETED | –EUR 47.95 | EUR 0.00 | –EUR 47.95 |
| 1. | PAYMENT | FROM | MEDOWARE | COMPLETED | EUR 50.00 | EUR 2.05 | EUR 47.95 |

Fig. 16

| MY ACCOUNT | SEND MONEY | REQUEST MONEY | MERCHANT TOOLS | AU |

OVERVIEW | ADD FUNDS | WITHDRAW | HISTORY | PROFILE

PAYMENT RECEIVING PREFERENCES

BLOCK PAYMENTS FROM U.S. USERS WHO DO NOT PROVIDE A CONFIRMED ADDRESS:
- ○ YES
- ○ NO
- ● ASK ME

BLOCK PAYMENTS IF THEY ARE SENT TO ME IN A CURRENCY THAT I DO NOT HOLD:
- ○ YES
- ● NO, ACCEPT THEM AND CONVENT THEM TO U.S. DOLLARS
- ○ ASK ME

1602

| MY ACCOUNT | SEND MONEY | REQUEST MONEY |

OVERVIEW | ADD FUNDS | WITHDRAW | HISTORY | P

PREMIER ACCOUNT OVERVIEW

NAME: SERAPHNE KOLOSKY
EMAIL: USA@BC.COM    (ADD EMAIL)
STATUS: UNVERIFIED (0)

BALANCE | MANAGE | TRANSFER          VIEW LIMITS

```
       U.S. DOLLAR (PRIMARY):   $263.08
                        EURO:   EUR 96.25
              POUND STERLING:   £193.00
   CURRENT TOTAL IN U.S. DOLLARS:  $643.05
```

EARN A RETURN ON YOUR U.S. DOLLAR BALANCE!

*Fig. 17*

LOG OUT | HELP

| MY ACCOUNT | SEND MONEY | REQUEST MONEY | MERCHANT TOOLS | AUCTION TOOLS |

OVERVIEW | ADD FUNDS | WITHDRAW | HISTORY | PROFILE

TRANSFER FUNDS

YOU MAY TRANSFER ALL OR A PORTION OF YOUR FUNDS FROM ONE CURRENCY BALANCE TO ANOTHER CURRENCY BALANCE.

TRANSFER: [ 50 ] [ U.S. DOLLAR ▼ ]
      TO: [ EURO BALANCE ▼ ]
         [ CALCULATE ]

BALANCES
```
        U.S. DOLLAR:   $265.00
               EURO:   EUR 96.25
     POUND STERLING:   £295.00
```

RESULTS:
THE CURRENT EXCHANGE RATE IS:
50.00 U.S. DOLLARS = 48.87 EUROS

[ TRANSFER ]  [ CANCEL ]

*Fig. 18*

```
                                                           LOG OUT | HELP
          | MY ACCOUNT | SEND MONEY | REQUEST MONEY | MERCHANT TOOLS | AUCTION TOOLS |
            OVERVIEW | ADD FUNDS | WITHDRAW | HISTORY | PROFILE
MANAGE CURRENCY BALANCES                              BACK TO PROFILE SUMMARIES
THE MANAGE CURRENCY TABLE DISPLAYS ALL OF THE CURRENCIES IN WHICH YOU MAY MAINTAIN A  [?]
BALANCE.
```

| CURRENCY BALANCE | | STATUS | BALANCE |
|---|---|---|---|
| ● | U.S. DOLLAR | PRIMARY OPEN | $263.00 |
| ○ | EURO | OPEN | EUR 96.25 |
| ○ | POUND STERLING | OPEN | £193.00 |

[OPEN BALANCE] [CLOSE BALANCE] [MAKE PRIMARY]                    [TRANSFER]

*Fig. 19*

```
          | MY ACCOUNT | SEND MONEY | REQUEST MONEY | MERCHANT TOOLS | AUCTION TOOLS |
            OVERVIEW | ADD FUNDS | WITHDRAW | HISTORY | PROFILE
WITHDRAW FUNDS BY ELECTRONIC TRANSFER                       SECURE TRANSACTION 🔒
IT USUALLY TAKES 3-4 BUSINESS DAYS TO TRANSFER FRUNDS FROM YOUR ACCOUNT TO YOUR
BANK ACCOUNT, BUT MAY TAKE LONGER DEPENDING ON YOUR BANK'S POLICIES.

FROM THIS BALANCE: [ EUR 96.25                  ▼]
            AMOUNT:   [ 50                          ]
                TO:   [ WELLS FARGO CHECKING (UNCONFIRMED) XXXXXX5867 ▼]

ADD BANK ACCOUNT

MULTI CURRENCY EXCHANGES BETWEEN PARTICIPANTS

RELATED APPLICATIONS

This application is a continuation of U.S. patent application Ser. No. 14/263,874, filed Apr. 28, 2014 and issued on Jun. 19, 2018 as U.S. Pat. No. 10,002,354, which is a continuation of U.S. patent application Ser. No. 13/567,902, filed Aug. 6, 2012, and issued as U.S. Pat. No. 8,712,913 entitled "Multi Currency Exchanges Between Participants," which is a continuation of U.S. patent application Ser. No. 13/212,994, filed Aug. 18, 2011, and issued as U.S. Pat. No. 8,249,990, entitled Multi Currency Exchanges Between Participants of a Network-Based Transaction Facility," which is a continuation of U.S. patent application Ser. No. 12/818,935, filed Jun. 18, 2010, and issued as U.S. Pat. No. 8,055,582, entitled "Multi Currency Exchanges Between Participants of a Network-Based Transaction Facility," which is a continuation of U.S. patent application Ser. No. 10/608,525, filed Jun. 26, 2003, and issued as U.S. Pat. No. 7,742,985, entitled "Multi Currency Exchanges Between Participants of a Network-Based Transaction Facility," all of which are incorporated herein by reference in their entirety.

TECHNICAL FIELD

The present invention relates generally to the field of e-commerce and, more specifically, to facilitating payment transactions in multiple currencies between participants.

BACKGROUND

Typically, an electronic payment system allows participants of a network-based transaction facility to collect payments online. For example, the payer may send money to the electronic payment system using a credit card or check, or funds in a payer account maintained by the electronic payment system. Recipients can store money in their accounts maintained by the electronic payment system, transfer the money to a separate bank account or have the electronic payment system cut them a check.

With the growth in international commerce, problems arise due to different monetary systems used in different countries. That is, money is generally expressed in different currencies in different countries and the value of the different currencies varies greatly.

Currency conversion is widely used to convert money from one currency into money of a different currency. However, currency conversion represents a significant economic risk to both buyers and sellers in international commerce. For example, when a buyer in the U.S. desires to buy a product in an online transaction facility from a seller in France, the buyer may use a credit card to pay the seller for the product. The credit card company may pay the seller in Euros, and then at an undetermined later date, it will bill an amount to the buyer in U.S. dollars. The amount billed to the buyer is determined by an exchange rate used at the time the credit card company settles the transaction. The time of this settlement is at the credit card company's discretion. The risk to the credit card company is minimal because the credit card company can settle the transaction when exchange rates are favorable. Thus, in this case, it is the buyer who bears the risk that the value of the buyer's currency will decline prior to this settlement.

In another example, a seller participating in an online transaction facility may decide to accept a different currency to be able to sell the product. In this case, the seller may later sell the currency to a currency trader, usually at a discount. The price the seller charges to the buyer who pays cash reflects both the cost of currency conversion and the risk that the rate used to establish the price of the product in a particular currency may have changed. This typically results in the buyer paying a higher price for the product and the seller incurring risk due to a possible change in currency exchange rates.

In yet another example, a buyer may convert from the native currency to a different second currency before the sale to be able to buy a product from a seller who only accepts payments in the second currency. In this case, the buyer can purchase goods at a price in the second currency, but cannot be certain of the value of the second currency relative to the buyer's native currency. Thus, the individual assumes the risk of devaluation of the second currency against the first currency. Further, the buyer bears the risk that the second currency may cease to be convertible into his native currency.

The above problems create inconvenience and uncertainty for participants in international commerce, thus discouraging the development of international commerce over electronic networks.

BRIEF DESCRIPTION OF THE DRAWINGS

The present invention is illustrated by way of example and not limitation in the figures of the accompanying drawings, in which like references indicate similar elements and in which:

FIGS. 11-20 are exemplary representations of various interfaces; and

DETAILED DESCRIPTION

A method and apparatus for facilitating online payment transactions in multiple currencies between users over a communications network are described. In the following description, for purposes of explanation, numerous specific details are set forth in order to provide a thorough understanding of the present invention. It will be evident, however, to one skilled in the art that the present invention may be practiced without these specific details.

System for Processing Online Payment Transactions

Figure 1:
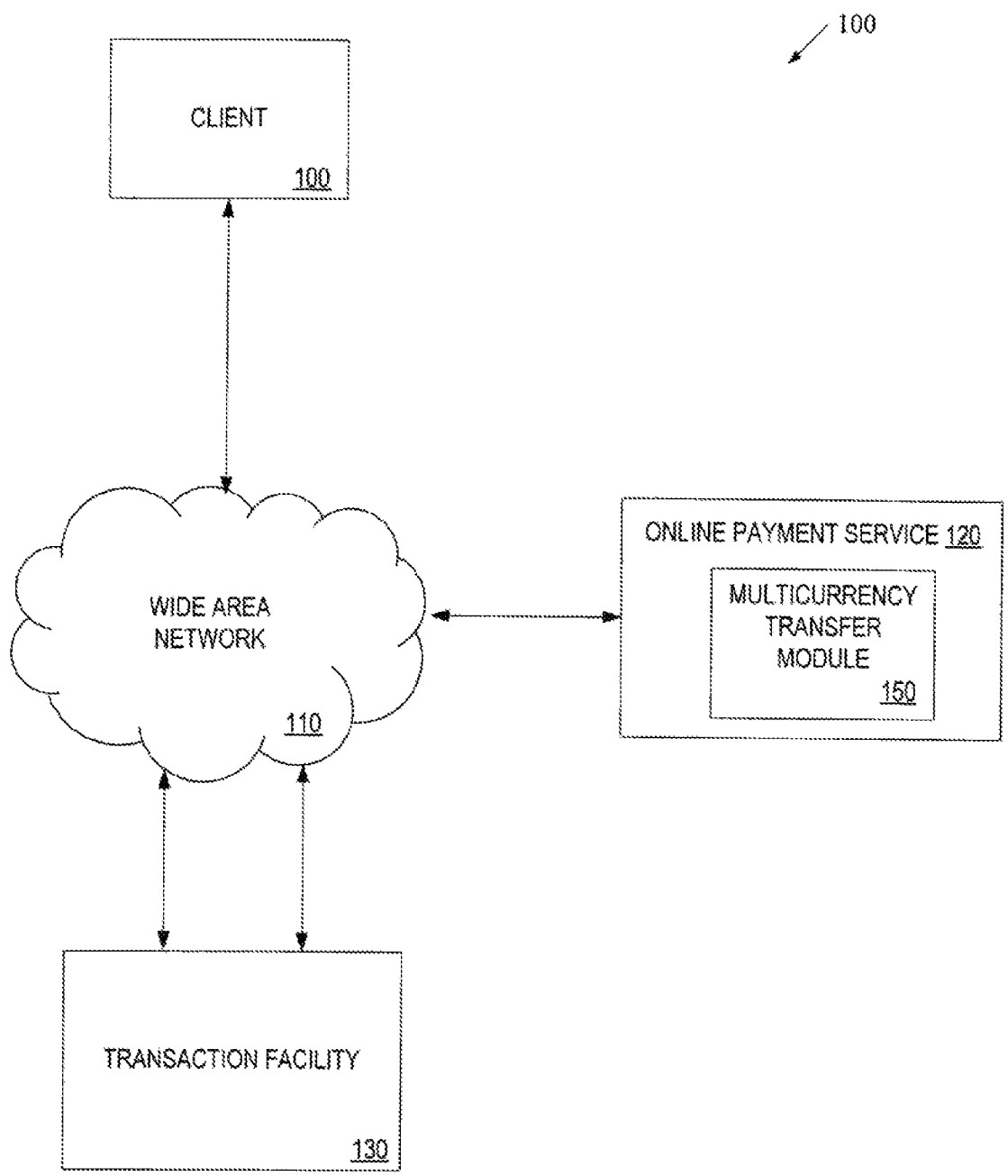
FIG. 1 is a block diagram of one embodiment of a system for processing online multi currency payment transactions between participants in a network-based transaction facility.

FIG. 1 is a block diagram of one embodiment of a system for processing online payment transactions in multiple currencies between participants in a network-based transaction facility. In this embodiment, a client 100 is coupled to a transaction facility 130 via a communications network, including a wide area network 110 such as, for example, the Internet. Other examples of networks that the client may utilize to access the transaction facility 130 include a local area network (LAN), a wireless network (e.g., a cellular network), or the Plain Old Telephone Service (POTS) network.

The client 100 represents a device that allows a user to participate in a transaction facility 130. The transaction facility 130 handles all transactions between various participants including the user of the client computer 100. In one embodiment, the transaction facility 130 may be an online auction facility represented by an auction web site visited by various participants including the user of the client computer 100. Alternatively, the transaction facility 130 may be an online retailer or wholesaler facility represented by a retailer or wholesaler web site visited by various buyers including the user of the client computer 100. In yet other embodiments, the transactions facility 130 may be any other online environment used by a participant to conduct business transactions.

The transaction facility 130 is coupled to an online payment service 120. In one embodiment, the transaction facility 130 is coupled to the online payment service 120 via a communications network such as, for example, an internal network, the wide area network 110, a wireless network (e.g., a cellular network), or the Plain Old Telephone Service (POTS) network. Alternatively, the online payment service 120 is integrated with the transaction facility 130 and it is a part of the transaction facility 130. The online payment service 120 is also coupled to the client 100 via any of the described above communications networks. The online payment service 120 is a service for enabling online payment transactions between participants of the transaction facility 130, including the user of the client computer 100.

In one embodiment, the online payment service 120 includes a multi-currency transfer module 150 that allows the participants to maintain account balances in different currencies and make online payments in different currencies in the course of business conducted in the transaction facility 130. The term "currency" as referred to herein may include, for example, denominations of script and coin that are issued by government authorities as a medium of exchange. In another example, a "currency" may also include a privately issued token that can be exchanged for another privately issued token or government script. For example, a company might create tokens in various denominations. This company issued "money" could be used by employees to purchase goods from sellers. In this case, an exchange rate might be provided to convert the company currency into currencies which are acceptable to merchants.

As will be discussed in more detail below, in one embodiment, the multi currency transfer module 150 allows the participants to make educated decisions as to which currency to choose for sending and receiving payments. In another embodiment, the multi currency module 150 provides the participants with a mechanism for managing their account balances in different currencies.

Figure 2:
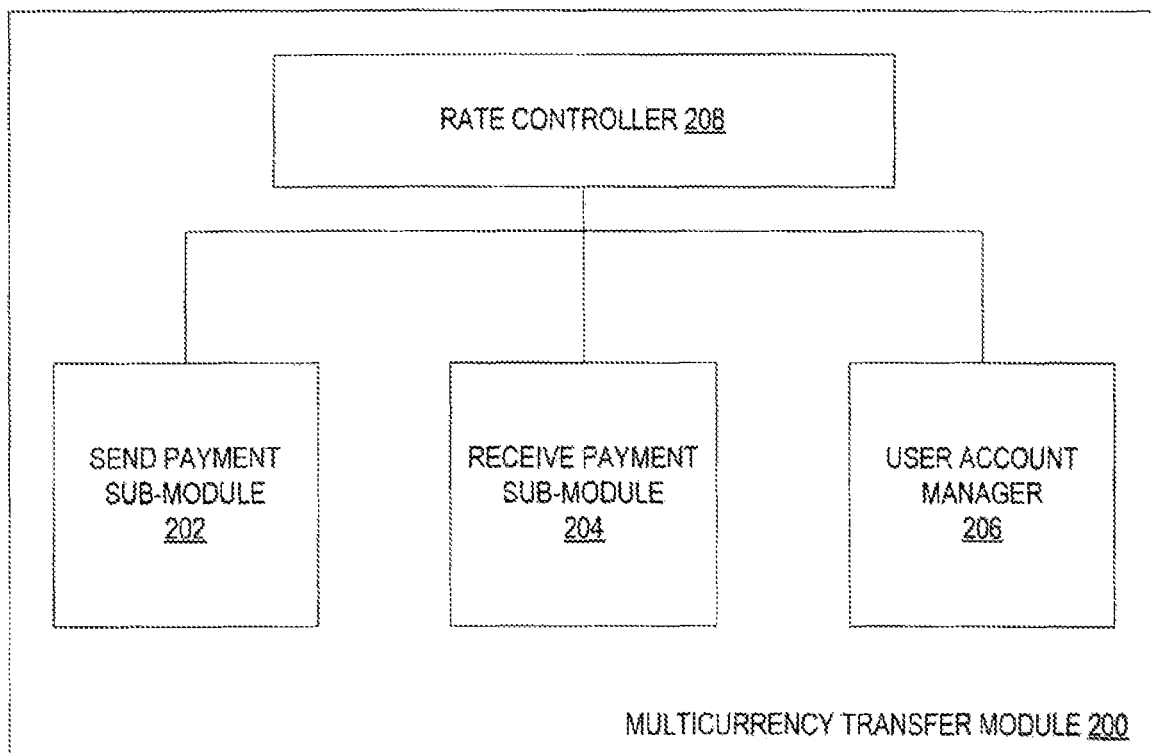
FIG. 2 is a block diagram of one embodiment of a multicurrency transfer module.

FIG. 2 is a block diagram of one embodiment of a multicurrency transfer module 200. The multicurrency transfer module 200 includes, in one embodiment, a send payment sub-module 202, a receive payment sub-module 204, a user account manager 206, and a rate controller 208.

In one embodiment, the send payment sub-module 202 is responsible for facilitating a sender selection of a currency in which a payment to a recipient is to be made, for funding the payment, for notifying a recipient about the payment, and for handling returned or denied payments. In one embodiment, if the sender does not hold an account balance in the currency that he or she selects for the payment, the send payment sub-module 202 is responsible for automatically converting funds from an existing sender balance in a different currency into the selected currency.

In one embodiment, the receive payment sub-module 204 is responsible for assisting a recipient in making a decision with respect to an acceptance of a sender payment in a specific currency, for converting the sender payment into a different currency if needed, and for notifying the sender about the recipient's decision.

In one embodiment, the user account manager 206 is responsible for allowing users to hold account balances in different currencies, for opening/removing currency balances within user accounts, and for performing transfers of funds between different currency balances within a user account.

In one embodiment, the rate controller 208 is responsible for periodically obtaining exchange rates from a third party system and using these rates to refresh rates stored in a database of the online payments service.

In one embodiment, the multi currency transfer module 200 also includes a request money sub-module that allows users to request money in any currency using a request money user interface with a list of currencies for user selection.

In one embodiment, the multicurrency transfer module 200 also includes a withdraw funds sub-module that allows users to withdraw money from any currency balance to a user bank account. If the withdrawal requires conversion, the relevant conversion data is presented to the user and the user is requested to confirm the final withdrawal.

Figure 3:
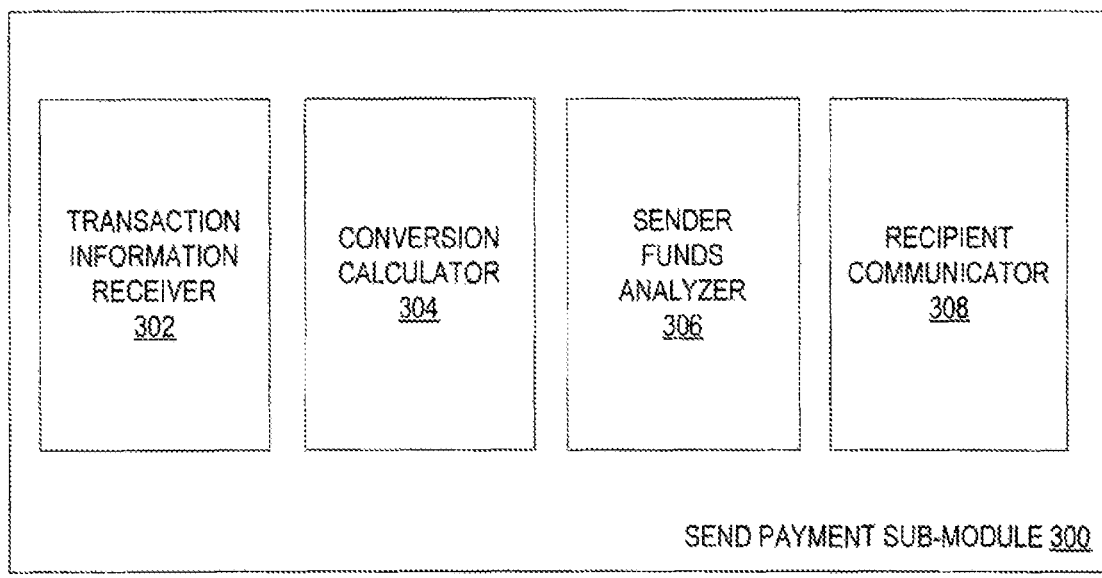
FIG. 3 is a block diagram of one embodiment of a send payment sub-module.

FIG. 3 is a block diagram of one embodiment of a send payment sub-module 300. The send payment sub-module 300 includes, in one embodiment, a transaction information receiver 302, a conversion calculator 304, a sender funds analyzer 306, and a recipient communicator 308.

The transaction information receiver 302 is responsible for communicating to a sender a user interface that facilitates user input of transaction information such as a recipient identifier (e.g., a recipient email address), a payment amount, a currency to be used for the payment, etc. In one embodiment, the user interface presents to the sender a list of currencies supported by the online payment system (e.g., U.S. dollars, Canadian dollars, Euros, pounds sterling, yen, etc.) and the sender is asked to select a specific currency from the list. The transaction information receiver 302 is further responsible for receiving transaction information entered by the sender via the user interface.

In one embodiment, if the currency selected by the sender for the payment is not a sender primary currency, the conversion calculator 304 is invoked. In another embodiment, the conversion calculator 304 is invoked only if the sender does not hold an account balance in the selected currency. Once invoked, the conversion calculator 304 is responsible for providing a current exchange rate between the sender-selected currency and the sender primary currency and for calculating an equivalent value in the sender primary currency for the payment amount. The primary currency may be, for example, a currency used in the majority of payment transactions that involved the sender. In another example, the primary currency is a currency that was specifically identified by the sender as primary. In yet another example, the primary currency may be a currency of a country in which the sender resides or a default currency provided by the online payment service 120.

The transaction information receiver 302 displays to the sender the conversion information provided by the conversion calculator 304 and requests the sender to confirm the payment in the selected currency. Once the sender sees the conversion information, the sender may decide that the current exchange rate for the selected currency is not favorable and select another currency. Alternatively, the sender may consider the current exchange rate as favorable and confirm the payment in the selected currency. In one embodiment, the sender may request, prior to confirming the payment, to view the history of currency conversion calculations from the sender's previous payment transactions to decide whether the current exchange rate is favorable.

The recipient communicator 308 is responsible for informing the recipient about the sender's payment in the selected currency, receiving data indicating whether the recipient decides to accept the payment in this currency, and communicating the recipient's decision to the sender. In one embodiment, if the recipient decides to deny the payment, the recipient communicator 308 displays to the sender a message offering to select a different currency.

The sender funds analyzer 306 is responsible for analyzing the sender's funds and determining how to fund the payment in the sender-selected currency. In one embodiment, if the sender holds an account balance in the selected currency, the sender funds analyzer 306 uses this account balance to fund the payment. Alternatively, if the sender does not hold an account balance in the selected currency, the sender funds analyzer 306 may use an account balance in the sender's primary currency to fund the payment. If the funds in the sender's primary balance are not enough to cover the payment, the sender funds analyzer 306 may ask the sender to specify an additional source for funding. This additional source may be, for example, a sender credit card, a sender bank account, a sender balance other then the primary balance, etc. In one embodiment, the sender is presented with relevant conversion information before requesting the sender's confirmation of any conversion that is necessary to fund the payment.

Figure 4:
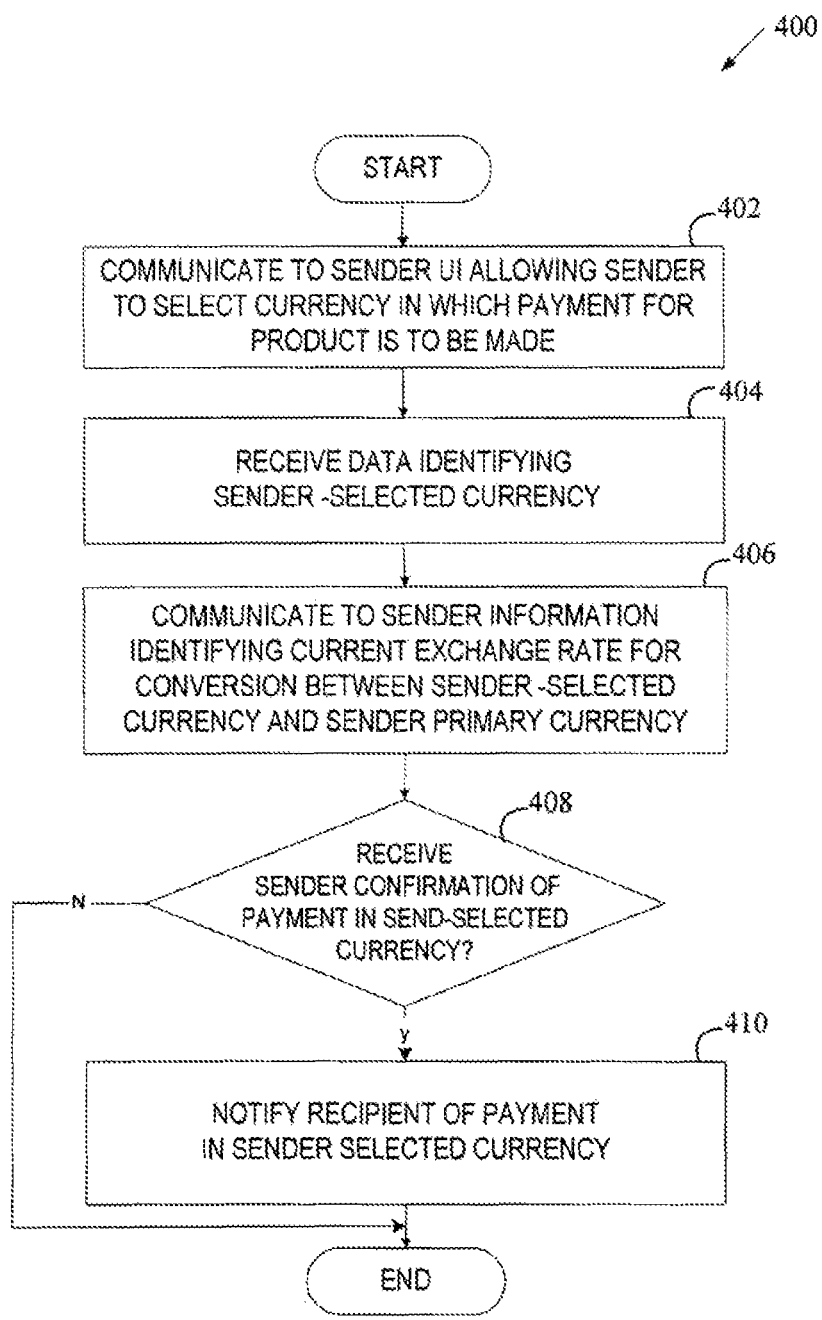
FIG. 4 is a flow diagram of one embodiment of a method for processing submissions of online multi currency payments.

FIG. 4 is a flow diagram of one embodiment of a method 400 for processing submissions of online multicurrency payments. The method 400 may be performed by processing logic, which may comprise hardware, software, or a combination of both. Processing logic may reside either in the online payment service 120, or partially or entirely in a separate device and/or system(s).

Referring to FIG. 4, the method 400 begins with processing logic communicating to a sender via a communications network a user interface that facilitates the sender input with respect to a desired currency in which a payment is to be made (processing block 402). In one embodiment, the user interface presents to the sender, for his or her selection, a list of currencies that are supported by the online payment service 120.

At processing block 404, processing logic receives data identifying the sender-selected currency from the sender via the communications network. In response, in one embodiment, processing logic determines whether the sender-selected currency is the sender's primary currency. If it is not, processing logic determines the current exchange rate for conversion between the sender-selected currency and the sender primary currency. In another embodiment, processing logic determines the current exchange rate only if the sender does not hold an account in the sender-selected currency.

Next, processing logic communicates to the sender via the communications network the current exchange rate for the conversion between the sender-selected currency and the sender primary currency (processing block 406). In one embodiment, processing logic also presents to the sender an equivalent value in the sender primary currency for the payment amount in the sender-selected currency. The presentation of the current conversion information (e.g., the exchange rate and the equivalent value) assist the sender in determining whether the terms for converting into the sender-selected currency are favorable at the present time. In addition, in one embodiment, the sender is provided with an opportunity to view the history of currency conversion calculations from previous transactions involving the sender to compare the current terms with prior terms.

Further, if processing logic receives from the sender a confirmation of the payment in the sender-selected currency (decision box 408), processing logic notifies the recipient about the payment in the sender selected currency (processing block 410).

Figure 5:
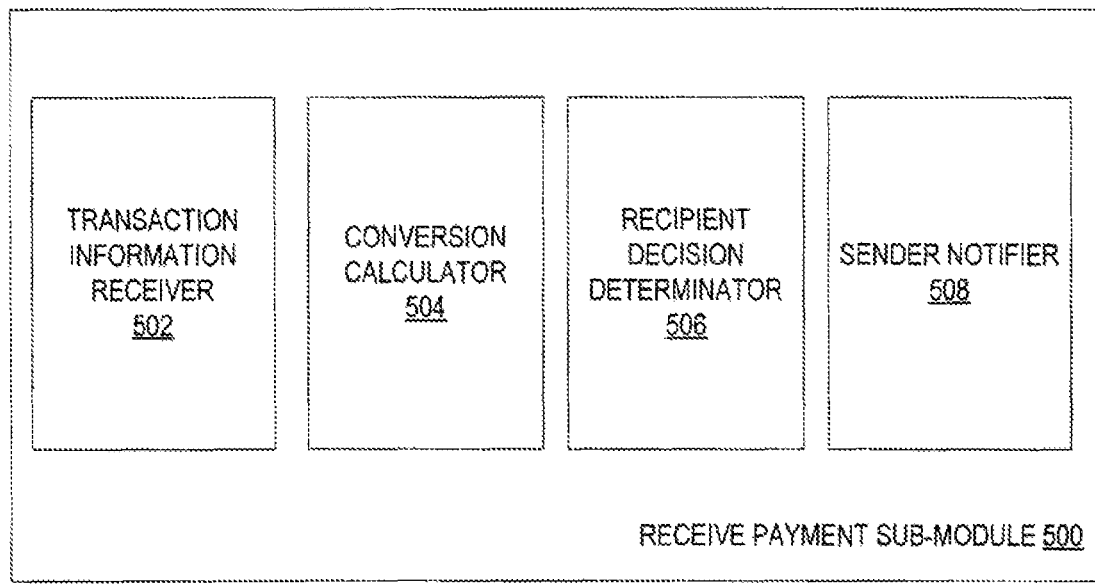
FIG. 5 is a block diagram of one embodiment of a receive payment sub-module.

FIG. 5 is a block diagram of one embodiment of a receive payment sub-module 500. The receive payment sub-module 500 includes, in one embodiment, a transaction information receiver 502, a conversion calculator 504, a recipient decision determinator 506, and a sender notifier 508.

The transaction information receiver 302 is responsible for receiving information about a sender's payment and communicating it to the recipient. The information about the sender payment may include, for example, the identifier of the sender (e.g., sender's name or email address), the payment amount, the sender-selected currency of the payment, etc.

In one embodiment, the transaction information receiver 502 is also responsible for determining whether the recipient holds an account balance in the sender-selected currency. If so, the transaction information receiver 502 is responsible for requesting a transfer of the payment amount to this account balance. If the recipient does not hold an account balance in the sender-selected currency, the conversion calculator 504 is invoked to provide a current exchange rate between the sender-selected currency and the recipient primary currency, and then the recipient decision determinator 506 communicates the current exchange rate to the recipient and requests the recipient's input with respect to an acceptance of the payment in the sender-selected currency. If the recipient accepts the payment in the sender-selected currency, the recipient decision determinator 506 requests to open a balance in the sender-selected currency within the recipient account. Alternatively, if the recipient accepts the payment in the sender-selected currency but also asks to convert it into the primary currency, the recipient decision determinator 506 performs the conversion and requests the addition of the resulting amount to the recipient's primary account balance.

In another embodiment, the recipient decision determinator 506 is responsible for requesting the recipient's input for every payment received from any sender. If the recipient specifies that he accepts the payment and wants to convert it into a different currency, the recipient decision determinator 506 is responsible for invoking the conversion calculator 504, communicating information provided by the conversion calculator 504 to the recipient, and obtaining the recipient's final confirmation of the acceptance of the payment.

In one embodiment, the conversion calculator 504 also calculates an equivalent value in a recipient primary currency (or some other currency specified by the recipient) for the payment amount in the sender-selected currency. The equivalent value is also presented to the recipient. Hence, the recipient is provided with information that can assist him in determining whether the acceptance of the payment in the sender-selected currency and/or conversion of the sender-selected currency into a different currency would be beneficial for the recipient at the present time. In addition, in one embodiment, the recipient is provided with an opportunity to view the history of currency conversion calculations from previous transactions involving the recipient to compare the current terms with prior terms.

Once the recipient specifies his decision, the sender notifier 506 notifies the sender about the recipient's decision.

Figure 6:
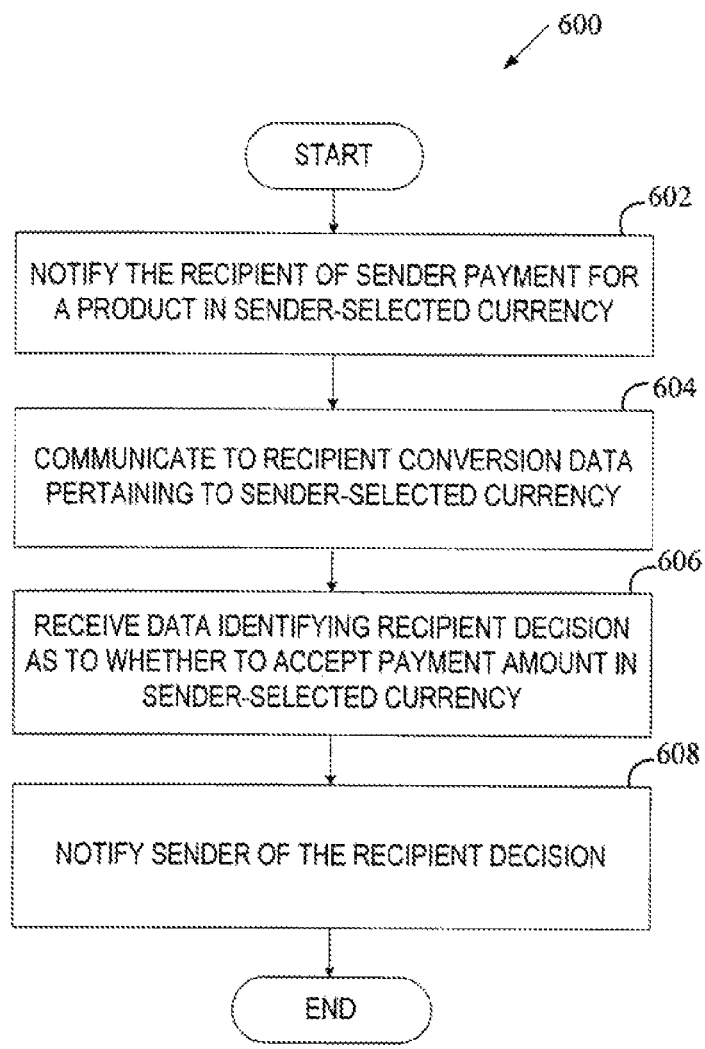
FIG. 6 is a flow diagram of one embodiment of a method for processing receipts of online multicurrency payments.

FIG. 6 is a flow diagram of one embodiment of a method 600 for processing receipts of online multi currency payments. The method 600 may be performed by processing logic, which may comprise hardware, software, or a combination of both. Processing logic may reside either in the online payment service 120, or partially or entirely in a separate device and/or system(s).

Referring to FIG. 6, the method 600 begins with processing logic communicating to a recipient via a communications network a notification of a sender payment in a sender-selected currency (processing block 602). At processing block 604, processing logic presents to the recipient via the communications network conversion data pertaining to a payment amount in the sender-selected currency. The conversion data may include an equivalent value in a recipient primary currency for the payment amount in the sender-selected currency. In one embodiment, the conversion data is communicated to the recipient if the recipient does not hold an account balance in the sender-selected currency. Alternatively, the conversion data is communicated to the recipient for every received payment.

In one embodiment, the notification about the sender payment and the conversion data is presented to the sender using a single user interface. In one embodiment, this user interface also allows the recipient to provide input for the recipient's decision with respect to an acceptance of the sender payment.

The presentation of the conversion data assists the recipient in determining which actions with respect to the payment in the sender-selected currency would be the most advantageous for the recipient at the present time. In one embodiment, the recipient may be also presented with a history of currency conversion calculations from previous transactions involving the recipient for comparison.

At processing block 606, processing logic receives from the recipient via the communications network data indicating the recipient's decision with respect to an acceptance of the payment in the sender-selected currency. In one embodiment, in which the recipient does not hold an account balance in the sender-selected currency, the recipient is provided with three decision options: (1) accept the payment and create a balance in the sender-selected currency within the recipient account, (2) accept the payment and convert it into the recipient's primary balance, and (3) deny the payment. If the recipient chooses the first option, processing logic requests a creation of a new balance within the recipient account and a transfer of the payment amount to this new balance. If the recipient chooses the second option, processing logic converts the payment amount into the recipient's primary balance and requests a transfer of the resulting amount to the recipient's primary balance.

In one embodiment, processing logic determines the recipient decision with respect to this payment based on payment receiving preferences previously provided by the recipient with respect to future payments in currencies for which the recipient does not hold a balance.

In one embodiment, processing logic assesses a receiving fee in the sender-selected currency if the recipient accepts the payment.

Afterwards, processing logic notifies the sender via the communications network of the recipient decision (processing block 608). In one embodiment, if the recipient denies the payment, processing logic presents to the sender a message offering the sender to select a different currency for the payment.

Figure 7:
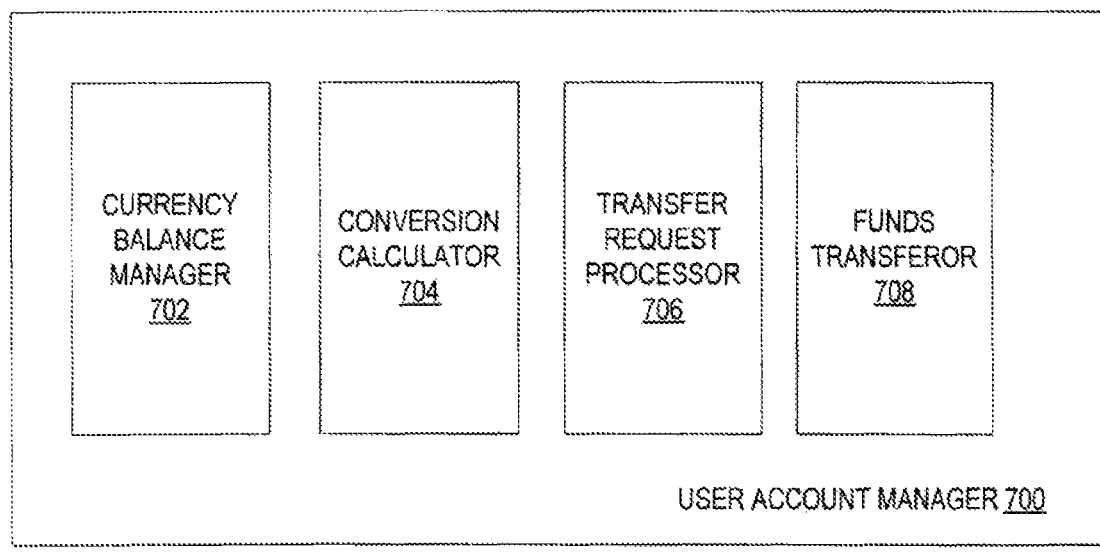
FIG. 7 is a block diagram of one embodiment of a user account manager.

FIG. 7 is a block diagram of one embodiment of a user account manager 700. The user account manager 700 includes, in one embodiment, a currency balance manager 702, a conversion calculator 704, a transfer request processor 706, and a funds transferor 708.

The currency balance manager 702 is responsible for maintaining balances in different currencies within a user account, opening new balances when needed and closing existing balances when requested by a user.

The conversion calculator 704 is responsible for providing current exchange rates and calculating amounts of potential and actual transfers.

The transfer request processor 706 is responsible for transferring funds between different currency balances within a user account. Prior to performing a transfer, the transfer request processor 706 displays conversion data provided by the conversion calculator 704 and then requests the user to confirm the transfer.

The funds transferor 708 is responsible for performing the transfer.

Figure 8:
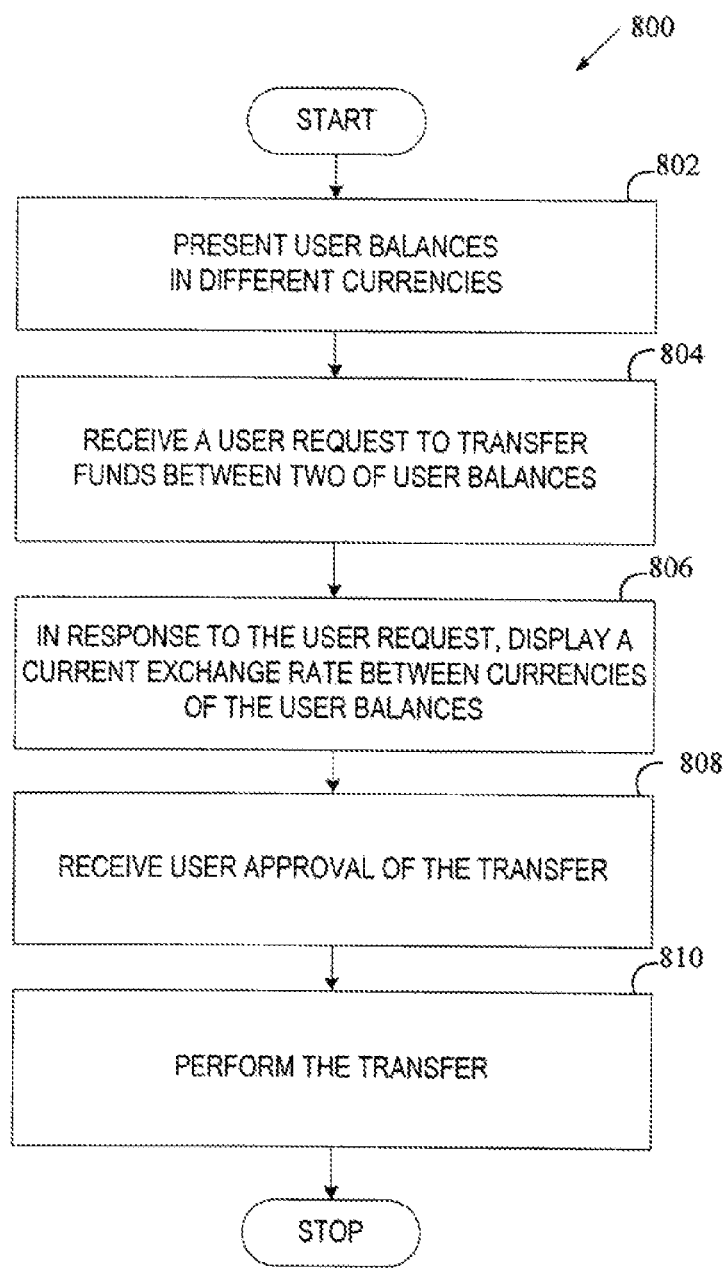
FIG. 8 is a flow diagram of one embodiment of a method for managing multicurrency balances of a user.

FIG. 8 is a flow diagram of one embodiment of a method 800 for managing multicurrency balances of a user. The method 800 may be performed by processing logic, which may comprise hardware, software, or a combination of both. Processing logic may reside either in the online payment service 120, or partially or entirely in a separate device and/or system(s).

Referring to FIG. 8, the method 800 begins with processing logic communicating to a recipient via a communications network information identifying a set of balances in different currencies within the user account (processing block 802). In one embodiment, the user is also presented with the combined total of all the balances in the user primary currency.

At processing block 804, processing logic receives from the user via the communications network data indicating a user desire to transfer funds between two currency balances. In response, processing logic presents to the user via the communications network data identifying a current exchange rate for conversion between currencies of the two balances (processing block 806).

Next, processing logic receives a user approval of the desired transfer (processing block 808) and performs the transfer (processing block 810).

As discussed above, a current exchange rate is periodically updated based on the rates obtained from a third party system. A third party may be a financial institution or any other organization that guarantees an exchange rate to the online payment service 120 during a predefined time interval. As a result, the online payment service 120 is not affected by any market fluctuations that may occur during this time interval and can provide its users with more up-to-date exchange rates.

Figure 9:
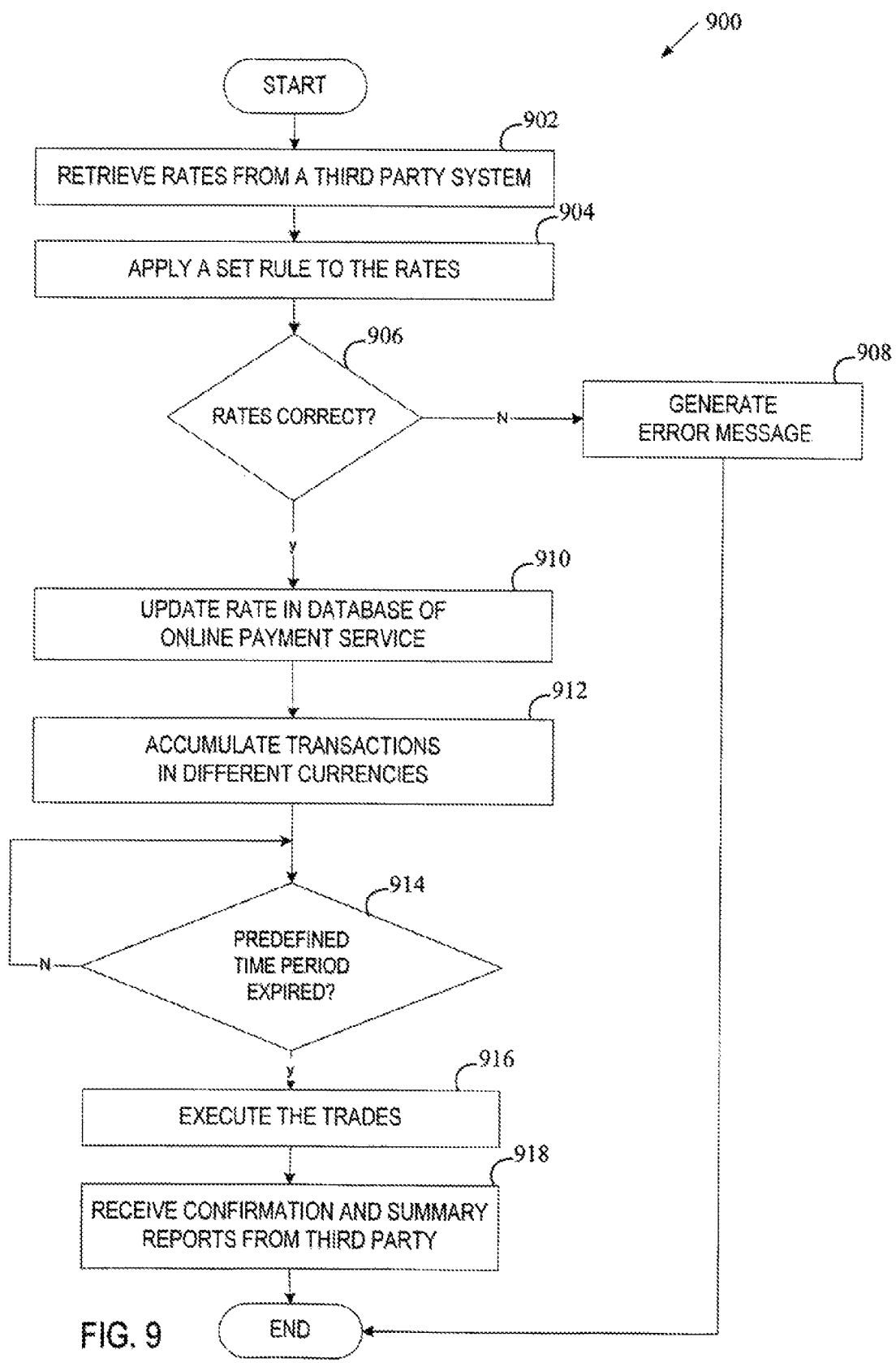
FIG. 9 is a flow diagram of one embodiment of a method for obtaining guaranteed exchange rates.

FIG. 9 is a flow diagram of one embodiment of a method 900 for obtaining guaranteed exchange rates. The method 900 may be performed by processing logic, which may comprise hardware, software, or a combination of both. Processing logic may reside either in the online payment service 120, or partially or entirely in a separate device and/or system(s).

Referring to FIG. 9, the method 900 begins with processing logic retrieving new exchange rates from a third party system (processing block 902). The new exchange rates have associated expiration dates and the online payment system is guaranteed the ability to trade against these rates within the specified window. In one embodiment, the new exchange rates are pulled via a client interface that interacts with a third party server. In one embodiment, the new exchange rates include a market exchange rate, a bid exchange rate and an ask exchange rate.

Next, processing logic applies a set of business rules to the new exchange rates (processing block 904). The set of business rules include a variety of checks (e.g., whether the new exchange rates have changed by more than 5% from the previous exchange rates) that are done to ensure that the rates are correct.

At decision box 906, processing logic determines whether the rates are correct. If not, processing logic generates an error message (processing block 908). If so, processing logic updates exchange rates currently stored in the live database of the online payment service with the new exchange rates (processing logic 910) and begins accumulating customer payment transactions in different currencies (processing block 912). When a predefined time period expires (decision box 914), processing logic requests the third party system to trade and settle the accumulated customer payment transactions (processing logic 916) and receives confirmation and summary reports once the trades are completed. In one embodiment, all transactions are funded and settled in a specific currency (e.g., U.S. dollars). In one embodiment, the trades are completed via a client interface that interacts with the third party server.

Figure 10:
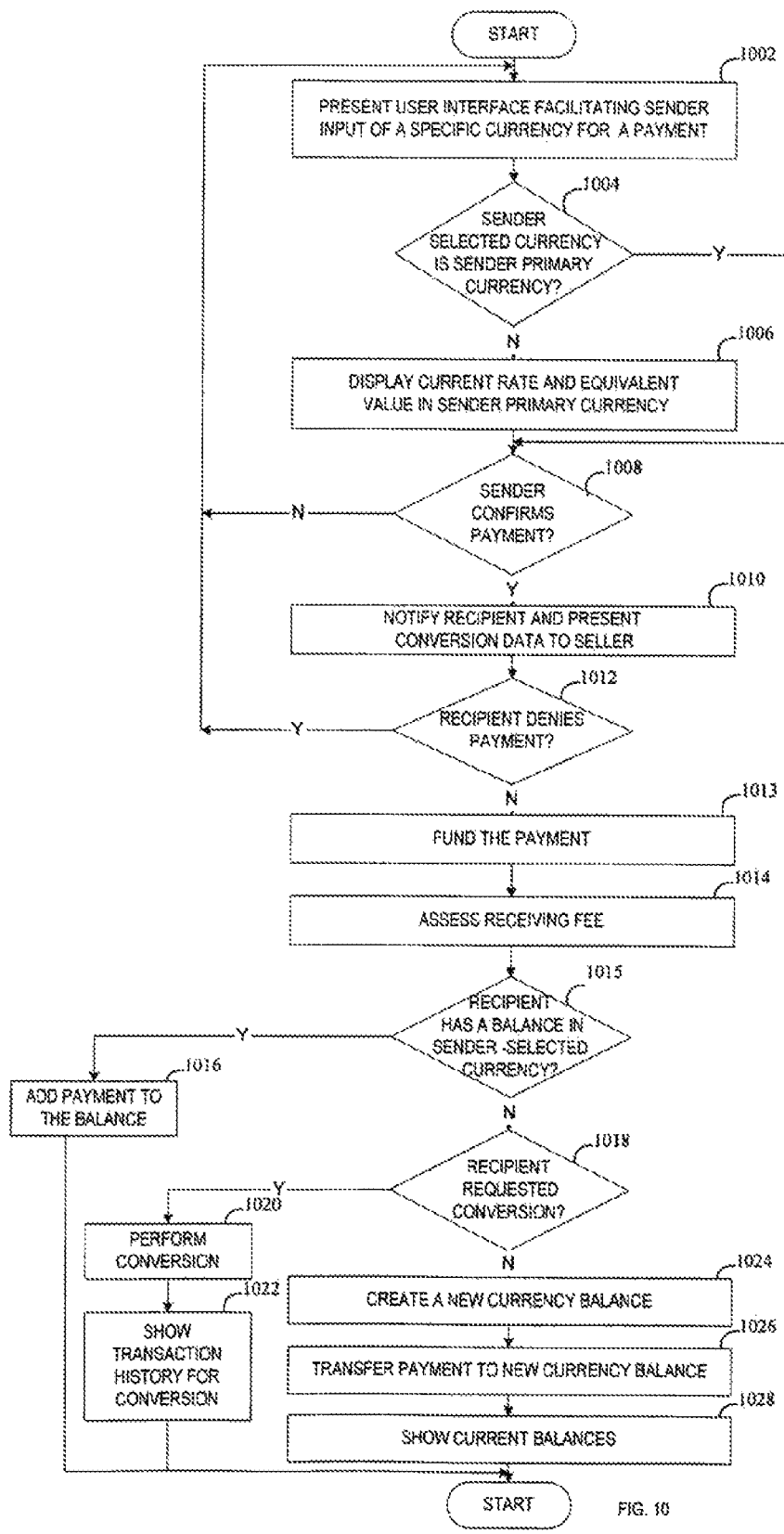
FIG. 10 is a flow diagram of one embodiment of a method for facilitating multi currency payment transactions between participants of a network-based transaction facility.

FIG. 10 is a flow diagram of one embodiment of a method 1000 for facilitating multi currency payment transactions between participants of a network-based transaction facility. The method 900 may be performed by processing logic, which may comprise hardware, software, or a combination of both. Processing logic may reside either in the online payment service 120, or partially or entirely in a separate device and/or system(s).

Referring to FIG. 10, the method 1000 begins with processing logic presenting to a sender a user interface that facilitates sender input of a specific currency for a payment (processing block 1002). Next, processing logic determines whether the sender-selected currency is a sender primary currency (decision box 1004). If so, the method 1000 proceeds directly to decision box 1008. If not, processing logic displays a current exchange rate for conversion between the sender-selected currency and the sender primary currency and an equivalent value in the sender primary currency (processing block 1006) and requests the sender to confirm the payment.

If the sender confirms the payment (decision box 1008), processing logic notifies the recipient about the payment in the sender-selected currency and presents to the recipient an equivalent value in the recipient's primary currency for the payment amount in the sender-selected currency (processing block 1010).

If the recipient denies the payment (decision box 1012), processing logic presents to the sender a message offering the sender to select a different currency.

If the recipient accepts the payment, processing logic funds the payment using one or more payment instruments of the sender (processing block 1013). In one embodiment, if the sender has an account balance in the sender-selected currency, processing logic funds the payment using this account balance. If the sender does not have such account balance, processing logic funds the payment using the sender primary account balance. If the primary account balance does not cover the payment, processing logic may use a sender credit card, a sender bank account, or other account balances within the sender account to fund the payment.

Further, if the recipient accepts the payment, processing logic assesses a receiving fee in the sender-selected currency (processing block 1014) and determines whether the recipient holds an account balance in the sender-selected currency (decision box 1015). If so, processing logic adds the payment to this balance (processing block 1016). If not, processing logic determines whether the recipient requested conversion of the accepted payment into the recipient primary currency (decision box 1018). If so, processing logic performs the conversion (processing block 1020), shows transaction history for the conversion (processing block 1022), and transfers the payment amount to the primary balance.

If the recipient did not request conversion, processing logic creates a new currency balance (processing block 1024), transfers the payment amount to the new currency balance (processing block 1026), and presents a list of existing currency balances with the total amount value to the recipient (processing block 1028).

In one embodiment, if processing logic receives a request to return the payment to the sender, processing logic performs the return in the currency in which the payment was originated using an original exchange rate.

Functions of the online payment service 120 pertaining to multi currency payments will now be described within the context of user interfaces, according to one embodiment of the present invention. Exemplary representations of the various interfaces are shown in FIGS. 11-20. While the exemplary interfaces are described as comprising markup language documents displayed by a browser, it will be appreciated that the described interfaces could comprise user interfaces presented by any Windows® client application or stand-alone application, and need not necessarily comprise markup language documents.

FIG. 11 illustrates an exemplary send money interface that enables a sender to specify which currency 1102 is to be used for a payment.

FIG. 12 illustrates an exemplary check payment details interface that displays a current exchange rate 1204 for conversion between the sender-selected currency and a sender primary currency and an equivalent value 1202 in the sender primary currency. The user interface also includes a send money button 1206 requesting the sender to confirm the payment.

FIG. 13 is an exemplary receive money interface that notifies a recipient about the sender's payment and requests him to specify his decision with respect to the payment. The receive money interface presents to the recipient the payment amount 1304 in the sender-selected currency and an equivalent value 1302 in the recipient primary currency.

FIG. 14 is an exemplary account overview interface which is presented if the recipient chose to accept the payment in the sender-selected currency. A new balance 1402 created in response to the recipient's acceptance is shown in the Balance box. The balance 1402 reflects an assessment of a receiving fee.

FIG. 15 is an exemplary transaction history interface that is presented in response to the recipient's request to accept the payment in the sender-selected currency and to convert it into the recipient primary currency. The transaction history includes 3 records: (1) the payment received in its original currency, (2) the conversion from the original currency, and (3) the conversion to the recipient's primary currency.

FIG. 16 is an exemplary payment receiving preferences interface that includes information 1602 specifying how the recipient wishes to handle payments that are sent in currencies that the recipient does not hold. As shown, the recipient can request that such payments be blocked, accepted and converted into a primary currency, or be asked about.

FIG. 17 is an exemplary account overview interface that identifies various currency balances within a user account and provides a total amount of all the balances in the primary currency.

FIG. 18 is an exemplary transfer funds interface that allows a user to transfer funds from one account balance to another. The transfer funds interface also presents a current exchange rate for the conversion, a resulting amount in the desired conversion, and a transfer button to confirm the transfer.

FIG. 19 is an exemplary manage currency interface that displays all the currency in which the user may maintain a balance, allows the user to open a new balance, remove an existing balance and make a certain balance primary.

FIG. 20 is an exemplary withdraw funds interface that allows a user to withdraw funds from any of his currency balances. Before completing the deposit, the funds are converted into the currency of the user bank account and the results are displayed to the user In summary, it will be appreciated that the above described interfaces, and underlying technologies, provide a convenient vehicle for facilitating multicurrency payment transactions in a transaction facility.

Figure 21:
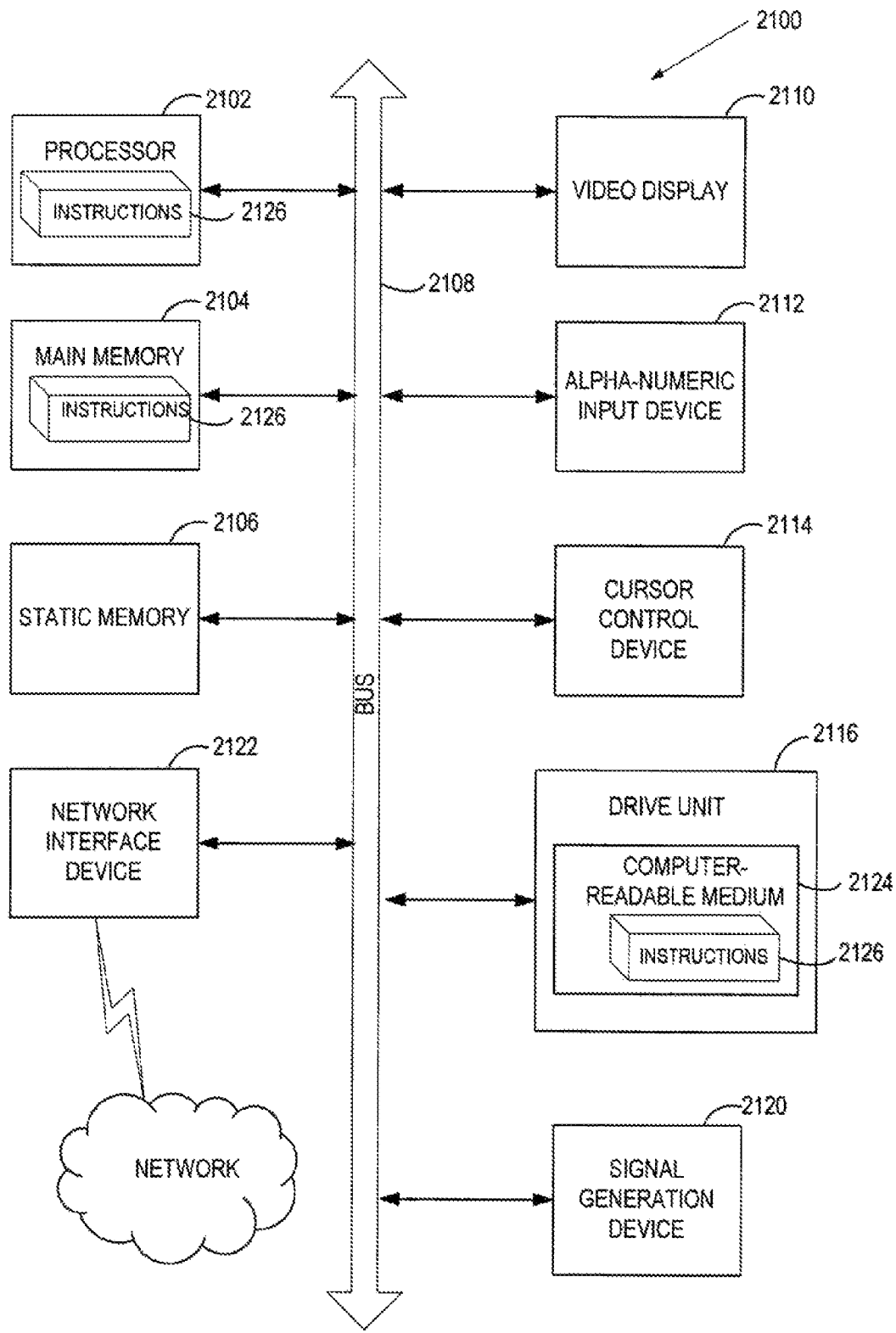
FIG. 21 is a block diagram of one embodiment of a computer system.

FIG. 21 shows a diagrammatic representation of machine in the exemplary form of a computer system 2100 within which a set of instructions, for causing the machine to perform anyone of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2100 includes a processor 2102, a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a cursor control device 2114 (e.g., a mouse), a disk drive unit 2116, a signal generation device 2120 (e.g., a speaker) and a network interface device 2122.

The disk drive unit 2116 includes a computer-readable medium 2124 on which is stored a set of instructions (i.e., software) 2126 embodying anyone, or all, of the methodologies described above. The software 2126 is also shown to reside, completely or at least partially, within the main memory 2104 and/or within the processor 2102. The software 2126 may further be transmitted or received via the network interface device 2122. For the purposes of this specification, the term "computer-readable medium" shall be taken to include any medium that is capable of storing or encoding a sequence of instructions for execution by the computer and that cause the computer to perform anyone of the methodologies of the present invention. The term "computer-readable medium" shall accordingly be taken to included, but not be limited to, solid-state memories, optical and magnetic disks, and carrier wave signals.

Thus, a method and apparatus for facilitating online payment transactions in a network-based transaction facility using multiple payment instruments have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
one or more computer-readable memories storing program instructions; and
one or more processors configured to execute the program instructions to cause the system to perform operations comprising:
accessing an electronic exchange rate database storing a plurality of exchange rates that are each guaranteed within a predefined time window;
applying a set of rules to the plurality of exchange rates;
determining, based on the applying, an accuracy of the plurality of exchange rates;
updating the electronic exchange rate database based on the determining;
providing, to a device of a first user via an application interface, a selectable option corresponding to a first currency of one or more currencies;
receiving, from the device of the first user via the application interface, an indication that the selectable option corresponding to the first currency has been selected;
determining that first user does not have an account that corresponds to the first currency;
in response to the determining that the first user does not have an account corresponding to the first currency, automatically converting, at least in part using the updated electronic exchange rate database, at least a portion of funds in a first account associated with the first user to the first currency;
causing a transitioning of the application interface to display the automatically converted at least the portion of the funds in the first currency; and
causing a funding of an online transaction involving the first user and a second user, wherein the funding is based on the automatically converted at least the portion of the funds in the first currency.

2. The system of claim 1, wherein the causing the funding of the online transaction is in response to receiving an acceptance notification from the second user.

3. The system of claim 1, wherein first account corresponds to a second currency that is different than the first currency.

4. The system of claim 3, wherein the automatically converting the at least the portion of funds in the first account to the first currency includes identifying, based on the updated electronic exchange rate database, a current exchange rate corresponding to the first currency and the second currency.

5. The system of claim 1, the operations further comprising providing, to the first user and via the application interface, conversion information corresponding to the converting the at least the portion of funds in the first account.

6. The system of claim 1, wherein the application interface comprises a web browser containing markup language.

7. The system of claim 1, wherein the applying the set of rules comprises applying a rule to determine whether any exchange rate of the plurality of exchange rates has changed by more a predefined percentage.

8. A method comprising:
accessing an electronic exchange rate database storing a plurality of exchange rates that are each guaranteed within a predefined time window;
applying a set of rules to the plurality of exchange rates;
modifying the electronic exchange rate database based on the applying of the set of rules;
receiving, from a device of a first user via an application interface having a selectable option corresponding to a first currency of one or more currencies, an indication that the selectable option corresponding to the first currency has been selected;
determining that the first user does not have an account that corresponds to the first currency;
in response to the determining that the first user does not have an account corresponding to the first currency, automatically converting, at least in part using the modified electronic exchange rate database, at least a portion of funds in a first account associated with the first user to the first currency;
causing a transitioning of the application interface to display the automatically converted at least the portion of the funds in the first currency; and
causing a funding of an online transaction involving the first user and a second user, wherein the funding is based on the automatically converted at least the portion of the funds in the first currency.

9. The method of claim 8, wherein the causing the funding of the online transaction is in response to receiving an acceptance notification from the second user.

10. The method of claim 8, wherein first account corresponds to a second currency that is different than the first currency.

11. The method of claim 10, wherein the automatically converting the at least the portion of funds in the first account to the first currency includes identifying, based on the modified electronic exchange rate database, a current exchange rate corresponding to the first currency and the second currency.

12. The method of claim 11, further comprising providing, to the first user and via the application interface, conversion information corresponding to the converting the at least the portion of funds in the first account.

13. The method of claim 8, wherein the application interface comprises a web browser containing markup language.

14. The method of claim 8, wherein the applying the set of rules comprises applying a rule to determine whether any exchange rate of the plurality of exchange rates has changed by more a predefined percentage.

15. A non-transitory computer readable medium storing program instructions, the program instructions when executed cause a machine to perform operations comprising:
accessing an electronic exchange rate database storing a plurality of exchange rates that are each associated with an expiration time;
receiving new exchange rate data;
applying a set of rules to the received new exchange rate data to determine an accuracy of the new exchange rate data;
modifying, in response to a determination that the new exchange rate data is accurate, the electronic exchange rate database based on the new exchange rate data;
receiving, from a device of a first user via an application interface having a selectable option corresponding to a first currency of one or more currencies, an indication that the selectable option corresponding to the first currency has been selected;
determining that the first user does not have an account that corresponds to the first currency;
in response to the determining that the first user does not have an account corresponding to the first currency, automatically converting, at least in part using the modified electronic exchange rate database, at least a portion of funds in a first account associated with the first user to the first currency;
causing a transitioning of the application interface to display the automatically converted at least the portion of the funds in the first currency; and
causing a funding of an online transaction involving the first user and a second user, wherein the funding is based on the automatically converted at least the portion of the funds in the first currency.

16. The non-transitory computer readable medium of claim 15, wherein the causing the funding of the online transaction is in response to receiving an acceptance notification from the second user.

17. The non-transitory computer readable medium of claim 15, wherein first account corresponds to a second currency that is different than the first currency.

18. The non-transitory computer readable medium of claim 17, the operations further comprising providing, to the first user and via the application interface, conversion information corresponding to the converting the at least the portion of funds in the first account.

19. The non-transitory computer readable medium of claim 15, wherein the application interface comprises a web browser containing markup language.

20. The non-transitory computer readable medium of claim 15, wherein the applying the set of rules comprises applying a rule to determine whether any exchange rate of the plurality of exchange rates has changed by more a predefined percentage.

* * * * *